United States Patent
Yen et al.

(10) Patent No.: US 10,776,845 B1
(45) Date of Patent: Sep. 15, 2020

(54) DEVICE VIRTUAL SHOWROOM

(71) Applicant: devicebook Inc., Bellevue, WA (US)

(72) Inventors: Wei Yen, Bellevue, WA (US);
Raymond Lo, Bellevue, WA (US);
Wingshun W. Ho, Bellevue, WA (US);
Sourabh Ladha, Bellevue, WA (US);
John Masin, Bellevue, WA (US)

(73) Assignee: devicebrook Inc., Bellevue, WA (US)

( * ) Notice: Subject to any disclaimer, the term of this patent is extended or adjusted under 35 U.S.C. 154(b) by 394 days.

(21) Appl. No.: 15/613,903

(22) Filed: Jun. 5, 2017

(51) Int. Cl.
*G06Q 30/06* (2012.01)
*H04L 29/08* (2006.01)

(52) U.S. Cl.
CPC ..... *G06Q 30/0623* (2013.01); *G06Q 30/0601* (2013.01); *G06Q 30/0645* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 6,008,777 | A * | 12/1999 | Yiu | G06F 3/038 341/173 |
| 6,539,478 | B1 * | 3/2003 | Furuya | G06F 21/305 713/150 |
| 9,813,657 | B2 * | 11/2017 | Chiu | H04N 5/4403 |
| 10,055,931 | B2 * | 8/2018 | Greenbaum | G07F 17/3211 |
| 2001/0044751 | A1 * | 11/2001 | Pugliese, III | G06Q 30/02 705/14.1 |
| 2002/0072974 | A1 * | 6/2002 | Pugliese, III | G06Q 30/02 705/14.16 |
| 2004/0010325 | A1 * | 1/2004 | Naitoh | G06Q 10/087 700/65 |
| 2006/0161639 | A1 * | 7/2006 | Kato | H04L 29/06 709/219 |
| 2007/0050264 | A1 * | 3/2007 | Lewis | G06Q 20/12 705/26.1 |
| 2013/0204876 | A1 * | 8/2013 | Szucs | G06F 16/94 707/738 |
| 2015/0112826 | A1 * | 4/2015 | Crutchfield, Jr. | G06Q 30/0601 705/26.1 |
| 2015/0262230 | A1 * | 9/2015 | Cypher | G06F 16/955 705/14.49 |
| 2015/0302474 | A1 * | 10/2015 | Lampert | G06Q 30/0255 705/14.53 |
| 2015/0334336 | A1 * | 11/2015 | Chiu | H04N 5/4403 348/383 |
| 2016/0292956 | A1 * | 10/2016 | Greenbaum | G07F 17/3211 |
| 2018/0068368 | A1 * | 3/2018 | Mattingly | G05B 19/0428 |

OTHER PUBLICATIONS

Anon., "Virtual Reality Seeks Practicality," Computerworld, vol. 26, Iss. 17(Apr. 27, 1992): 26 (Year: 1992).*
Peng and Ke, "Consumer Trust in 3D Virtual Worlds and its Impact on Real World Purchase Intention," Nankai Business Review International, 6.4, pp. 381-400 (2015). (Year: 2015).*

* cited by examiner

*Primary Examiner* — Nicholas D Rosen
(74) *Attorney, Agent, or Firm* — Nixon & Vanderhye, P.C.

(57) ABSTRACT

A Vendor sells or rents, or exhibits Devices by exhibiting them in the showroom, or some particular locations with set up, and allows the customers to experience them. We, with the advance of technologies, create the same scenario for the Vendor except that the showed Devices are located in Remote Locations, like an on-demand virtual showroom.

29 Claims, 4 Drawing Sheets

DEVICE VIRTUAL SHOWROOM

CROSS-REFERENCE TO RELATED APPLICATIONS

None.

STATEMENT REGARDING FEDERALLY SPONSORED RESEARCH OR DEVELOPMENT

None.

FIELD

This technology relates to networked applications, and more particularly to a device virtual showroom.

BACKGROUND AND SUMMARY

People sell or rent electronic devices, or electronically controllable equipment, by exhibiting them in the showroom and allowing the customers to experience them to promote sales of the devices or the equipment. We create the same sales-promotion scenario except that the showed merchandises are located remotely in the vendors' locations, like an on-demand virtual showroom.

One aspect of an example non-limiting embodiment provides a method or system comprising: a Vendor makes one or more Devices available through Internet to Users at Remote Locations of their convenience; and the User Interacts with a Device, or Devices, remotely through Internet to experience the Device, or Devices, before potential purchasing or renting of such a Device or Devices. The Vendor may also install video cameras, or/and microphones, or/and speakers to allow a User to monitor the sequence of engaged activities. The Vendor may also use or impose some form of Access Control on his Device.

Another aspect of an example non-limiting embodiment provides a method or system comprising Multiple Vendors make their Devices available through Internet to Users at Remote Locations of their convenience; and the User Interacts with multiple Devices at the same or different Remote Locations through Internet to experience the Devices before potential purchasing or renting of one or more of the Devices; wherein the said Devices belonging to a mixture of owners, i.e., the same Vendor, and/or multiple different Vendors, and/or other non-Vendor persons, and/or himself. At least one of the involved Devices may belongs to a Vendor. All, or some of, the Vendors also install video cameras, or/and microphones, or/and speakers, to allow a User to monitor all, or parts of, sequence of engaged activates. All, or some of, the Vendors also use, impose, some forms of Access Control on their Devices.

A further aspect of a non-limiting embodiment provides a method or system comprising: Multiple Vendors making their Devices available through Internet to Users at Remote Locations of their convenience; the User Interacts with multiple Devices at the same or different Remote Locations through Internet to experience the Devices for any possible purpose; the said Devices could belong to a mixture of owners, i.e., the same Vendor, and/or multiple different Vendors, and/or other non-Vendor persons, and/or himself. At least one of the involved Devices may belong to a Vendor. All, or some of, the participants may also install video cameras, or/and microphones, or/and speakers, to allow a User to monitor all, or parts of, sequence of engaged activates. All, or some of, the participants also use, impose, some forms of Access Control on their Devices.

BRIEF DESCRIPTION OF THE DRAWINGS

The following detailed description of exemplary non-limiting illustrative embodiments is to be read in conjunction with the drawings of which.

DEFINITIONS

Figure 1:
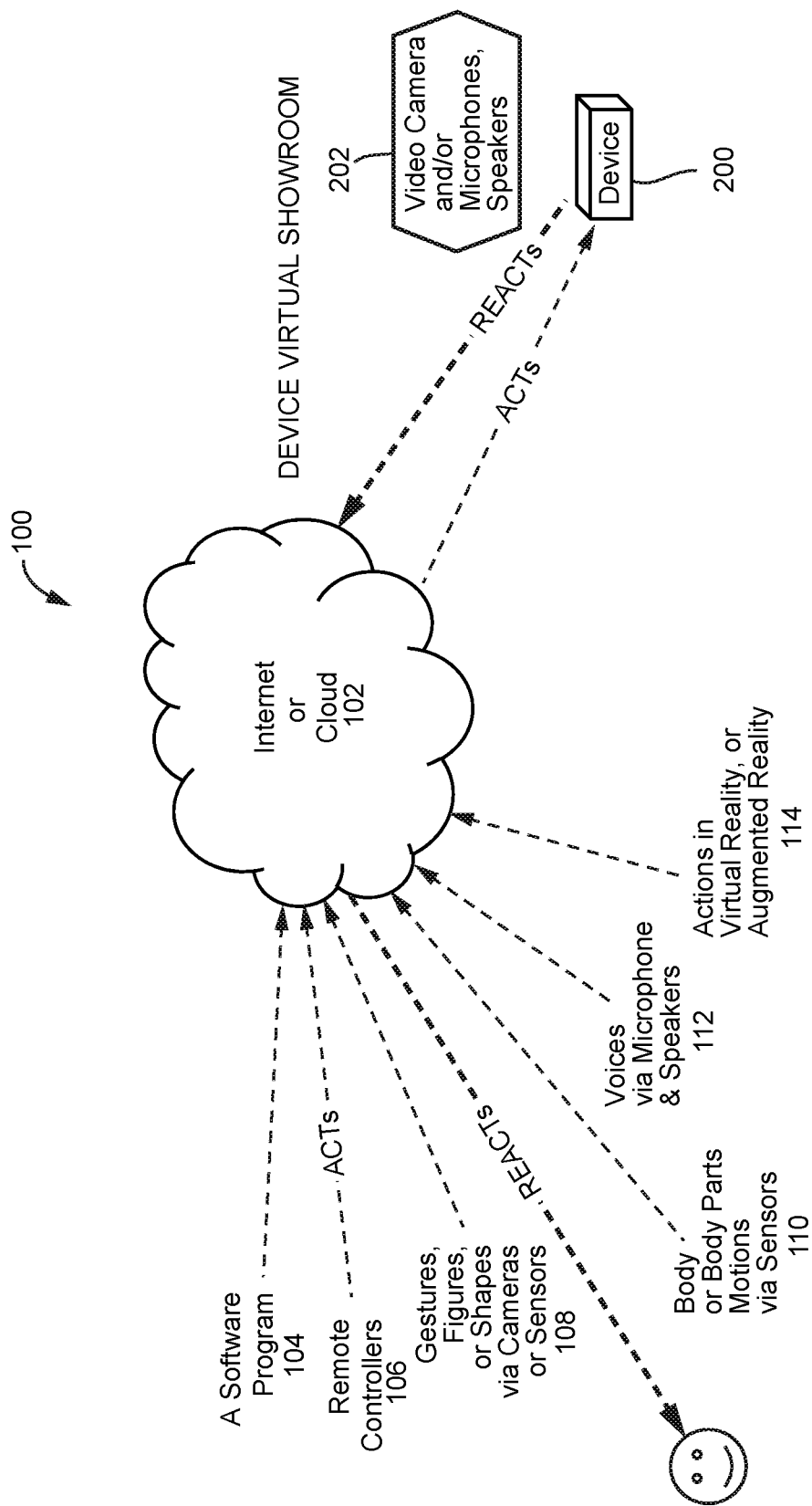
FIG. 1 shows a non-limiting on demand virtual showroom system.

Device: means an electronic device or an electronically controllable equipment, a physical device. The Device is commercially available and must be available to general public, and it must be re-usable.

Remote Location: means a Device physically in a different location from a User. The User is at, at least, out of line-of-sight of a Device of interest, such as the User and the Device are located in different buildings, different cities, different countries, or different continents.

Vendor: The owner, the provider, or the possessor of the Device, who intend to profit from providing such a Device for a User to use. For example, to make possible for a User to experience the device, a Vendor could profit from making the sale of the device, or renting the device.

Here, Vendor includes someone directly or indirectly providing the Device on the Vendor's behalf.

User: A prospect, a potential customer, who currently doesn't own or does not have the Device in possession. And, User is in any public or private location anywhere as he sees fit at his sole convenience. It's not a Vendor decided or dictated location.

The User and the Vendor have no relationship. They have no particular relationship, such as, but not limited to, organizational, membership, or personal relationship, to bring them together in the context of this patent. The only common interest of the User and the Vendor, in the context of this patent, is the direct or indirect commerce of the said Device of interest, such as, but not limited to, buying, selling, or renting of the Device.

Vendor Location: a public or private location, anywhere Vendor decides for his own convenience.

Interact: means a User acts and the Device-of-interest reacts, or the other way around. It could be act and react, or/and a sequence of such acts and reacts. It could stop in half way as the User or the Vendor wishes.

The User could act through, but not limited to, remote controllers, or/and gestures sensors, or/and facial expression sensors, or/and body motions sensors, or/and voice sensors, or/and a software program, or/and actions in virtual reality, or/and actions in augmented reality, to cause signals being communicated to the Device of interest through the Internet. And the Device reacts by communicating reacting signals back to the User through the Internet.

Access Control: means certain Terms and Conditions are imposed, and/or certain security measures are imposed, and/or certain permissions are required, and/or certain User's information is required, and/or a software on the Vendor's behalf to impose, and/or certain time-based (such as time-limit) mechanisms are imposed, on accessing a Device of interest by the Vendor. In other words, some forms of Vendor's permissions are required to access the Device of interest by a User.

DETAILED DESCRIPTION OF NON-LIMITING EMBODIMENTS

A Vendor sells or rents, or exhibits Devices by exhibiting them in the showroom, or some particular locations with set up, and allows the customers to experience them. We create the same scenario for the Vendor except that the showed Devices are located in Remote Locations, like an on-demand virtual showroom.

Figure 2:
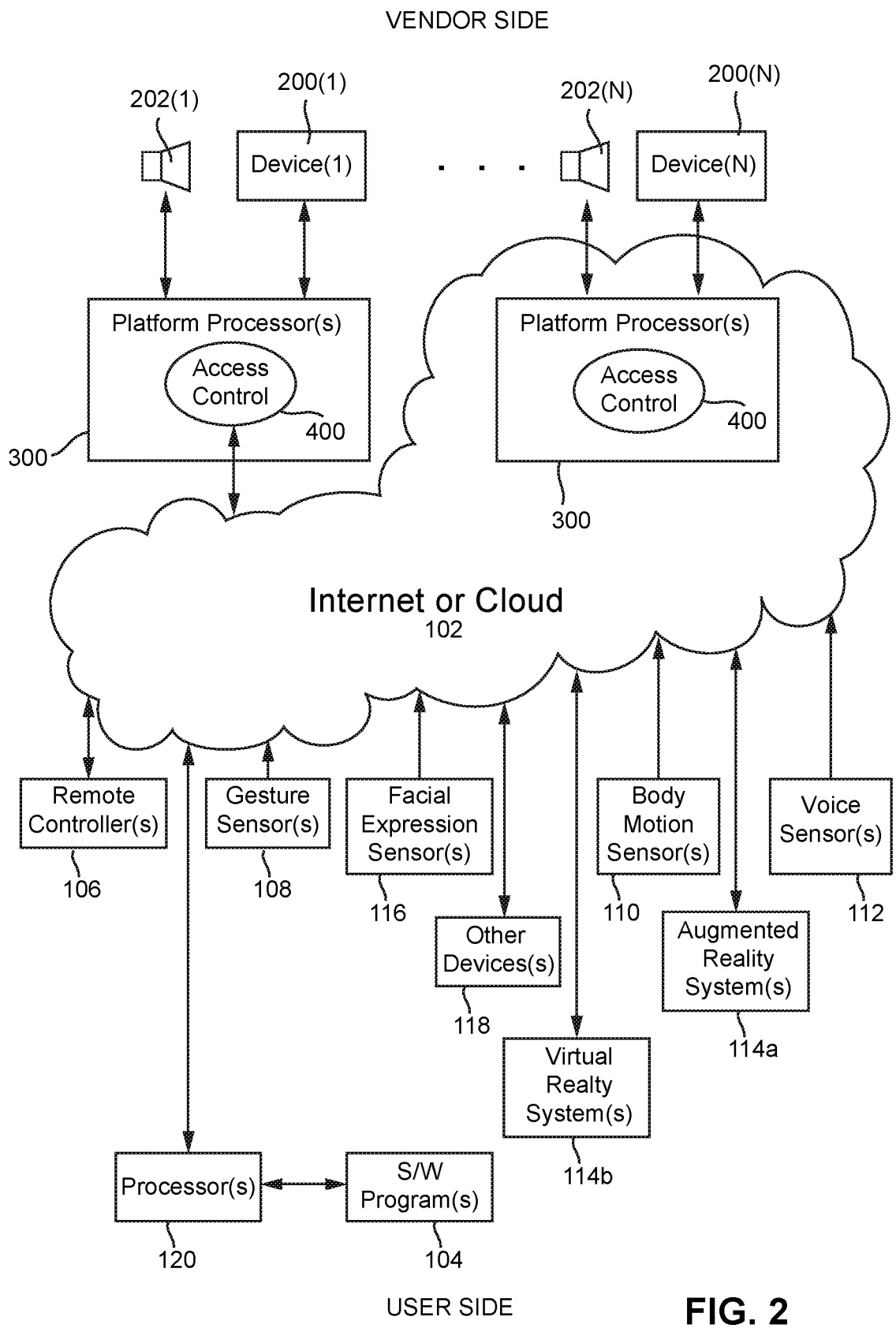
FIG. 2 shows another view of a non-limiting virtual showroom system.

As FIGS. 1 and 2 depict, showed Devices 200 electronically, wired or wirelessly, directly, or indirectly, connect through the Internet 102 (or, through an Internet Cloud, or through an Internet Cloud Platform 300) to allow a User to exercise their (one or a sequence of) acts on, controls to, manipulations on, or causes of controls over, the Device, in turn, to experience the reacts of the Device.

The User could act through, but not limited to, remote controllers 106, or/and gestures sensors 108, or/and facial expression sensors 116, or/and body motions sensors 110, or/and voice sensors 112, or/and a software program 104, or/and actions in virtual reality 114b, or/and actions in augmented reality 114a, to cause signals being communicated to the Device 200 of interest through the Internet 102. And the Device 200 reacts by communicating reacting signals back to the User through the Internet 102. Such reacting signals may be presented to the User through virtual reality 114b, augmented reality 114a and/or other devices 118.

The action, or reaction, of the affected Device 200 could also be visualized and/or audited through video cameras and/or microphones and speakers 202 streaming in real-time. The entire progress of manipulating, and interacting with, the Device 200 could be monitored like a live event.

Figure 4:
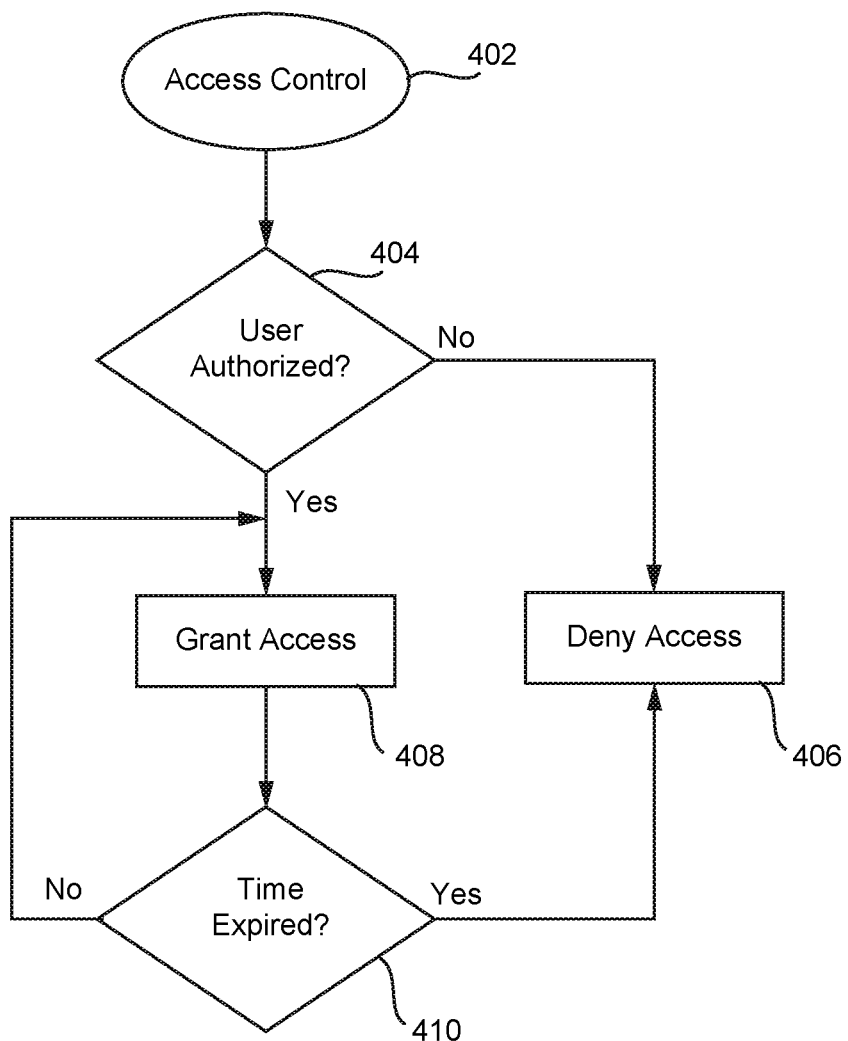
FIG. 4 shows an example non-limiting access control method.

The Vendor's Device 200 may use some form of Access Controls 400 so that the security, and/or the terms and conditions of the use of the device is under control and agreed. And/or, the access could also be some form of time-based Access Controls 400, such as the access is controlled by embedding the time-limit in each permission of access. For example, once a potential customer remotely connects to the device 200 (FIG. 4 block 408), after e.g., 10-minutes of playing around with the device, the session will automatically time-out at the end of the e.g., 10-minutes allowance (FIG. 4 block 410). And/or, the Access Control 400 could simply be a Vendor's permission (FIG. 4 block 404), or a software's permission on the Vendor's behalf.

Figure 3:
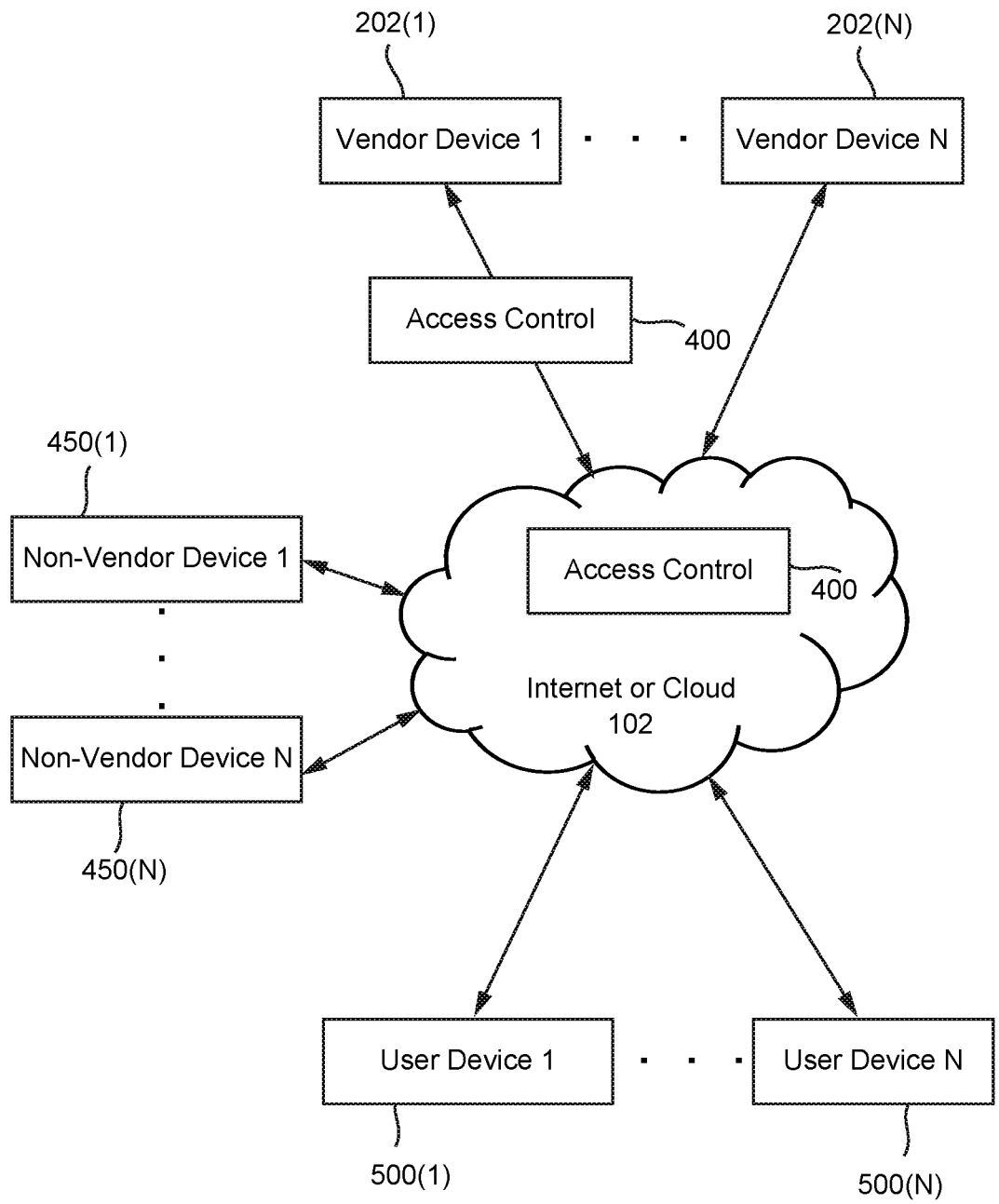
FIG. 3 shows a non-limiting arrangement in which some Devices are User Devices.

And, multiple Vendors' Devices 200, could participate in the scenario, and/or non-Vendor's Devices 450, and/or even the User's own Devices 500 could participate in the scenario. See FIG. 3. For example, a direct act of a User, or indirect act through a piece of software 104 or an application software, triggers the actions and reactions of multiple Devices 200, 450 and/500; some or all Devices 200 in the context could belong to one or multiple Vendors. All Devices and actions involved in the scenario could also be visualized and monitored through video camera and/or microphones and speakers 202 streaming, or video camera streaming in real-time, individually, or collectively in some forms.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method comprising:
   a Vendor making at least one reusable electronic or electronically controllable Device available through the Internet for interacting with Users at Remote Locations of the Users' convenience, wherein the at least one Device is physically in a different location from the Users and the Users are in any public or private locations determined by the Users and not at Vendor-decided or Vendor-dictated locations; and
   a User interacting with the at least one Device remotely through the Internet to experience the at least one Device, before potential purchasing or renting of such at least one Device, including the User acting to cause signals being communicated to the at least one Device through the Internet and the at least one Device responsively reacting by communicating reacting signals back to the User through the Internet.

2. The method of claim 1 wherein the Vendor also installs at least one of video cameras, microphones, and speakers to enable a User to monitor a sequence of engaged activities.

3. The method of claim 2 wherein the Vendor also uses or imposes some form of Access Control on the at least one Device.

4. The method of claim 1 wherein the Vendor also uses or imposes some form of Access Control on the at least one Device.

5. A method comprising:
   Multiple Vendors making their reusable electronic or electronically controllable Devices available through the Internet to Users at Remote Locations of convenience of the Users, wherein the Devices are physically in different locations from the Users and the Users are in any public or private locations determined by the Users and not at Vendor-decided or Vendor-dictated locations; and
   a User interacting with multiple Devices at the same or different Remote Locations through the Internet to experience the Devices before potential purchasing or renting of one or more of the Devices, including the User acting to cause signals being communicated to the multiple Devices through the Internet and the multiple Devices responsively reacting by communicating reacting signals back to the User through the Internet;
   wherein the multiple Devices may all belong to a single Vendor, or the multiple Devices may belong to multiple Vendors, or the multiple Devices may belong to one or more persons who are not Vendors.

6. The method of claim 5 wherein at least one of the said Devices belongs to a Vendor.

7. The method of claim 6 wherein all, or some of, the Vendors also install at least one of video cameras, microphones, and speakers, to allow the User to monitor all, or parts of, a sequence of engaged activities.

8. The method of claim 7 wherein all, or some of, the Vendors also use or impose one or more forms of Access Control on their Devices.

9. The method of claim 6 wherein all, or some of, the Vendors also use or impose one or more forms of Access Control on their Devices.

10. A method comprising:
    Multiple Vendors making their reusable electronic or electronically controllable Devices available through the Internet to Users at Remote Locations of the Users' convenience, wherein the Devices are physically in different locations from the Users and the Users are in any public or private locations determined by the Users and not at Vendor-decided or Vendor-dictated locations; and a User interacting with multiple Devices at the same or different Remote Locations through the Internet to experience the Devices for any possible purpose, including the User acting to cause signals being communicated to the multiple Devices through the Internet and the multiple Devices responsively reacting by communicating reacting signals back to the User through the Internet;

wherein the multiple Devices may all belong to a single Vendor, or the multiple Devices may belong to multiple Vendors, or the multiple Devices may belong to one or more persons who are not Vendors.

11. The method of claim 10 wherein at least one of the said Devices belongs to a Vendor.

12. The method of claim 11 wherein all, or some of, the participants also install at least one of video cameras, microphones, and speakers, to allow a User to monitor all, or parts of, a sequence of engaged activities.

13. The method of claim 12 wherein all, or some of, the participants also uses or imposes some forms of Access Control on their Devices.

14. The method of claim 11 wherein all, or some of, the participants also uses or imposes some forms of Access Control on their Devices.

15. A system comprising:
at least one reusable electronic or electronically controllable Vendor Device available through the Internet to Users at Remote Locations of the Users' convenience, wherein the at least one Vendor Device is physically in a different location from the Users and the Users are in any public or private locations determined by the Users and not at Vendor-decided or Vendor-dictated locations; and an interface operatively coupled to the at least one Vendor Device, the interface enabling at least one User to Interact with the at least one Vendor Device remotely through the Internet to experience the at least one Vendor Device before potential purchasing of or renting such at least one Vendor Device, including the at least one User acting to cause signals being communicated to the at least one Vendor Device through the Internet and the at least one Vendor Device responsively reacting by communicating reacting signals back to the User through the Internet.

16. The system of claim 15 further including at least one of video cameras, microphones, and speakers to allow the at least one User to monitor a sequence of engaged activities.

17. The system of claim 16 further including Vendor-used and/or Vendor-imposed Access Control on the at least one Vendor Device.

18. The system of claim 15 further including Vendor-used and/or Vendor-imposed Access Control on the at least one Vendor Device.

19. A system comprising:
a first reusable electronic or electronically controllable Device a first Vendor makes available through the Internet to Users at Remote Locations of the Users' convenience, wherein the first Device is physically in a different location from the Users and the Users are in any public or private locations determined by the Users and not at Vendor-decided or Vendor-dictated locations;

a second reusable electronic or electronically controllable Device a second Vendor makes available through the Internet to Users at Remote Locations of the Users' convenience, wherein the second Device is physically in a different location from the Users; and an interface operatively coupled to the first and second Devices, the interface enabling at least one User to Interact with the first and second Devices at the same or different Remote Locations through the Internet to experience the Devices before potential purchasing or renting of one or more of the Devices, including enabling the at least one User acting to cause signals being communicated to the at least one Device through the Internet and enabling the at least one Device to responsively react by communicating reacting signals back to the at least one User through the Internet;

wherein the first and second Devices may all belong to a single Vendor, or the first and second Devices may belong to multiple Vendors, or the first and second Devices may belong to one or more persons who are not Vendors.

20. The system of claim 19 wherein at least one of the first Device or the second Device belongs to a Vendor.

21. The system of claim 20 further including at least one of video cameras, microphones, and speakers installed by all, or some of, the first and second Vendors, to allow a User to monitor all, or parts of, a sequence of engaged activities.

22. The system of claim 21 further including Access Controls configured to use and/or impose one or more forms of Access Control by all, or some of, the first and second Vendors on the first Device and/or the second Device.

23. The system of claim 20 further including Access Controls configured to use and/or impose one or more forms of Access Control by all, or some of, the first and second Vendors on the first Device and/or the second Device.

24. A system comprising:
electronic or electronically controllable Devices made available by Multiple Vendors through the Internet to Users at Remote Locations of Users' convenience, wherein the Devices are physically in a different location from the Users and the Users are in any public or private locations determined by the Users and not at Vendor-decided or Vendor-dictated locations; and an interface coupled to the Devices, the interface enabling a User to Interact with multiple Devices at the same or different Remote Locations through the Internet to experience the Devices for any possible purpose, including enabling acting by the User to cause signals to be communicated to the at least one Device through the Internet and enabling the at least one Device to responsively react by communicating reacting signals back to the User through the Internet;

wherein the multiple Devices may all belong to a single Vendor, or the multiple Devices may belong to multiple Vendors, or the multiple Devices may belong to one or more persons who are not Vendors.

25. The system of claim 24 wherein at least one of the Devices belongs to a Vendor.

26. The system of claim 25 further including at least one of video cameras, microphones, and speakers installed by all, or some of, participants to allow a User to monitor all, or parts of, a sequence of engaged activities.

27. The system of claim 26 further including some forms of Access Control used or imposed by all, or some of, the participants on their Devices.

28. The system of claim 25 further including some forms of Access Control used or imposed by all, or some of, participants on their Devices.

29. A non-transitory computer readable memory device storing instructions that, when executed by at least one processor, control the at least one processor to perform:
  making at least one electronic or electronically controllable Vendor Device available through the Internet to Users at Remote Locations of the Users' convenience, wherein the Vendor Device is physically in a different location from the Users and the Users are in any public or private locations determined by the Users and not at Vendor-decided or Vendor-dictated locations; and
  enabling at least one User to Interact with the at least one Vendor Device remotely through the Internet to experience the at least one Vendor Device before potential purchasing of or renting such a Device, including enabling the at least one User acting to cause signals being communicated to the at least one Device through the Internet and enabling the at least one Device to responsively react by communicating reacting signals back to the at least one User through the Internet.

\* \* \* \* \*